(12) United States Patent
Kodama

(10) Patent No.: US 6,285,676 B1
(45) Date of Patent: Sep. 4, 2001

(54) METHOD OF CONTROLLING BANDWIDTH OF VIRTUAL PATH CAPABLE OF REDUCING LOAD OF TRANSIT SWITCH

(75) Inventor: Tomoaki Kodama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/074,412

(22) Filed: May 8, 1998

(30) Foreign Application Priority Data

May 8, 1997 (JP) .................................................. 9-118347

(51) Int. Cl.[7] ...................................................... H04L 12/28
(52) U.S. Cl. .............................................................. 370/395
(58) Field of Search ..................................... 370/232–236, 370/368, 252, 465, 477, 466, 471, 468, 230, 231, 400, 244, 248, 338, 390–395, 397

(56) References Cited

U.S. PATENT DOCUMENTS 5,200,952 * 4/1993 Bernstein et al. ................... 370/466
5,878,029 * 3/1999 Hasegawa et al. .................. 370/236

FOREIGN PATENT DOCUMENTS 9-51341  2/1999 (JP) .

* cited by examiner

*Primary Examiner*—Wellington Chin
*Assistant Examiner*—Premell Jones
(74) *Attorney, Agent, or Firm*—McGinn & Gibb, PLLC

(57) ABSTRACT

In an asynchronous transfer mode network, a virtual path is established between two subscriber switches through a transit switch. A virtual channel is established between two terminals which are connected to the subscriber switches, respectively. Any one of the subscriber switches detects a command signal sent from a terminal to establish/release the virtual channel. The subscriber switch judges whether or not it is necessary to change bandwidth of the virtual path on the basis of the command signal. The subscriber switch produces a direction signal for directing the transit switch to extend/reduce the bandwidth of the virtual path when the specific subscriber judges that it is necessary to change the bandwidth of the virtual path. The transit switch extends/reduces the bandwidth of the virtual path by a predetermined step in response to the direction signal.

8 Claims, 8 Drawing Sheets

METHOD OF CONTROLLING BANDWIDTH OF VIRTUAL PATH CAPABLE OF REDUCING LOAD OF TRANSIT SWITCH

BACKGROUND OF THE INVENTION

This invention relates to an asynchronous transfer mode (ATM) network, particularly, relates to a method of controlling bandwidth of virtual path between two ATM subscriber switches connected to each other through at least one ATM transit switch.

An ATM network must guarantee bandwidth of a call which is established by negotiation with the terminal (i.e. a source) to guarantee quality of the call. This is because traffic of data transmitted by the terminal is changed with time and the ATM network can neither determine nor estimate the data traffic.

The ATM network negotiates with the terminal to decide a maximum data transfer rate when the call is established. The ATM network guarantees the maximum data transfer rate to guarantee perfect quality of service (QoS) for the call.

In the ATM network, each node which relates to the call must process some tasks when the call is established and released. For example, the node calculates free bandwidth and renews a management table.

There is a case that an ATM transit switch is connected to many terminals through a plurality of ATM subscriber switch. In this case, the ATM transit switch relates to the many calls and spends a long time for processing the tasks. Accordingly, the ATM transit switch will become bottleneck for the conventional ATM network.

SUMMARY OF THE INVENTION

It is therefore an object of this invention to provide a method capable of reducing processing load of a transit switch in an asynchronous transfer mode network.

It is another object of this invention to provide a subscriber switch capable of reducing processing load of a transit switch in an asynchronous transfer mode network.

It is still another object of this invention to provide the highly performance ATM network including a subscriber switch which can reduce processing load of a transit switch.

Other object of this invention will become clear as the description proceeds.

On describing the gist of this invention, it is possible to understand that a method of controlling bandwidth of a virtual path accommodates a virtual channel in an asynchronous transfer mode network. The virtual path is established between two subscriber switches through a transit switch. The virtual channel is established between two terminals which are connected to the subscriber switches, respectively.

According to the gist of this invention, the method comprises the steps of detecting a command signal sent from an source which is one of the terminals for establishing/releasing the virtual channel at a specific subscriber switch which is one of the subscriber switches and which is connected to the source, judging at the specific subscriber switch whether or not it is necessary to change bandwidth of the virtual path on the basis of the command signal, producing a direction signal for directing the transit switch to extend/reduce the bandwidth of the virtual path at the specific subscriber switch when the specific subscriber judges that it is necessary to change the bandwidth of the virtual path, and extending/reducing the bandwidth of the virtual path at the transit switch by a predetermined step in response to the direction signal.

According to another gist of this invention, a subscriber switch is for use in an asynchronous transfer mode network which has terminals and a transit switch and which establishes a virtual path to accommodate a virtual channel. The subscriber switch comprises a detecting section to detect a command signal sent from an source which is one of the terminals for establishing/releasing the virtual channel. A judging section is connected to the detecting section to judge whether or not it is necessary to change bandwidth of the virtual path in the basis of the command signal. A routing section is connected to the judging section to produce a direction signal for directing the transit switch and to extend/reduce the bandwidth of the virtual path when the specific subscriber judges that it is necessary to change the bandwidth of the virtual path.

According to still another gist of this invention, a transit switch is for use in an asynchronous transfer mode network which has subscriber switches connected to the transit switch for establishing a virtual path to accommodate a virtual channel. The transit switch comprises a receiving section to receive a transmission signal sent from one of the subscriber switches. A judging section is connected to the receiving section to judge that the transmission signal is a direction signal or a passage signal. A changing section is connected to the judging section to change the bandwidth of the virtual path in response to the transmission signal when the transmission signal is the direction signal. A passing section is connected to the judging section to pass the transmission signal to another subscriber indicated by the transmission signal when the transmission signal is the passage signal.

According to further still another gist of this invention, an asynchronous transfer mode network uses a virtual path to accommodate a virtual channel. The virtual path is established between two subscriber switches connected to terminals through a transit switch. The asynchronous transfer mode network comprises a detecting section which is arranged in each subscriber switch to detect a command signal sent from an source which is one of the terminals for establishing/releasing the virtual channel. A judging section is arranged in each subscriber switch and is connected to the detecting means to judge whether or not it is necessary to change bandwidth of the virtual path on the basis of the command signal. A producing section is arranged in each subscriber switch and connected to the judging section to produce a direction signal for directing said transit switch and to extend/reduce the bandwidth of the virtual path when the specific subscriber judges that it is necessary to change the bandwidth of the virtual path. An extending/reducing section is arranged in the transit switch to extend/reduce the bandwidth of the virtual path by a predetermined step in response to the direction signal.

DESCRIPTION OF THE PREFERRED EMBODIMENT

Figure 1:
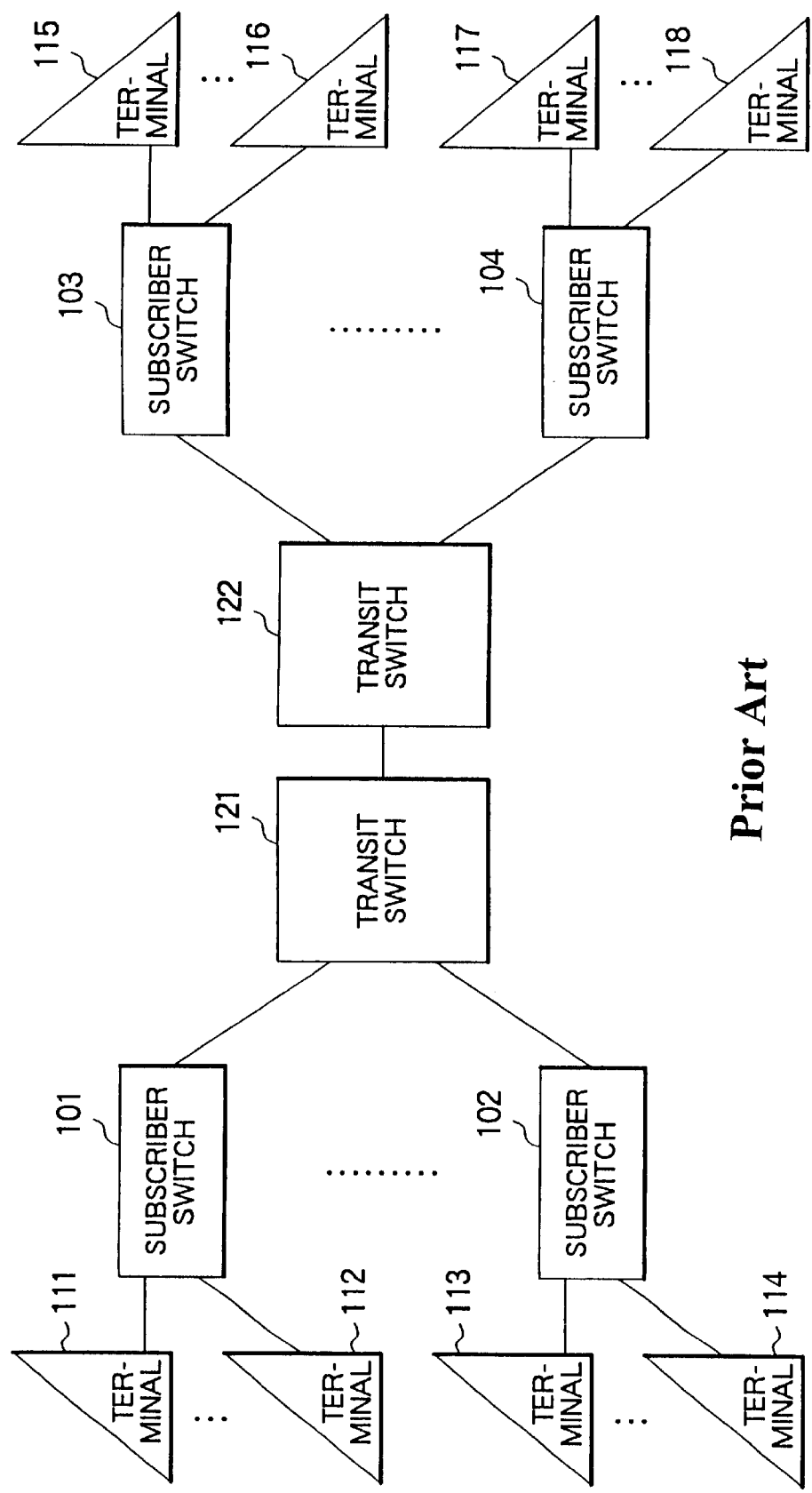
FIG. 1 shows a simple structure of a conventional asynchronous transfer mode network.

Referring to FIG. 1, description will be at first directed to a conventional ATM network for a better understanding of this invention.

In FIG. 1, the conventional ATM network has a plurality of ATM subscriber switches 101–102 and 103–104 to accommodate a plurality of terminals 111–112, 113–114, 115–116 and 117–118. At least one ATM transit switch connects the ATM subscriber switches to one another. For example, ATM transit switches 121 and 122 are connected to each other and connect the ATM subscriber switches 101–102 and 103–104 to one another. Thus, the ATM network adopts a tree structure that each of the ATM transit switch is connected to the ATM subscriber switchs.

In this structure, there is a case that each ATM transit switch must indirectly accommodate many terminals through the ATM subscriber switches. In such a case, the ATM transit switch often multiplexes transmitting signals sent from the ATM subscriber switches to translate the transmitting signal. Accordingly, the ATM transit switch will not be able to process call initiation when the call initiations occur frequently.

Figure 2:
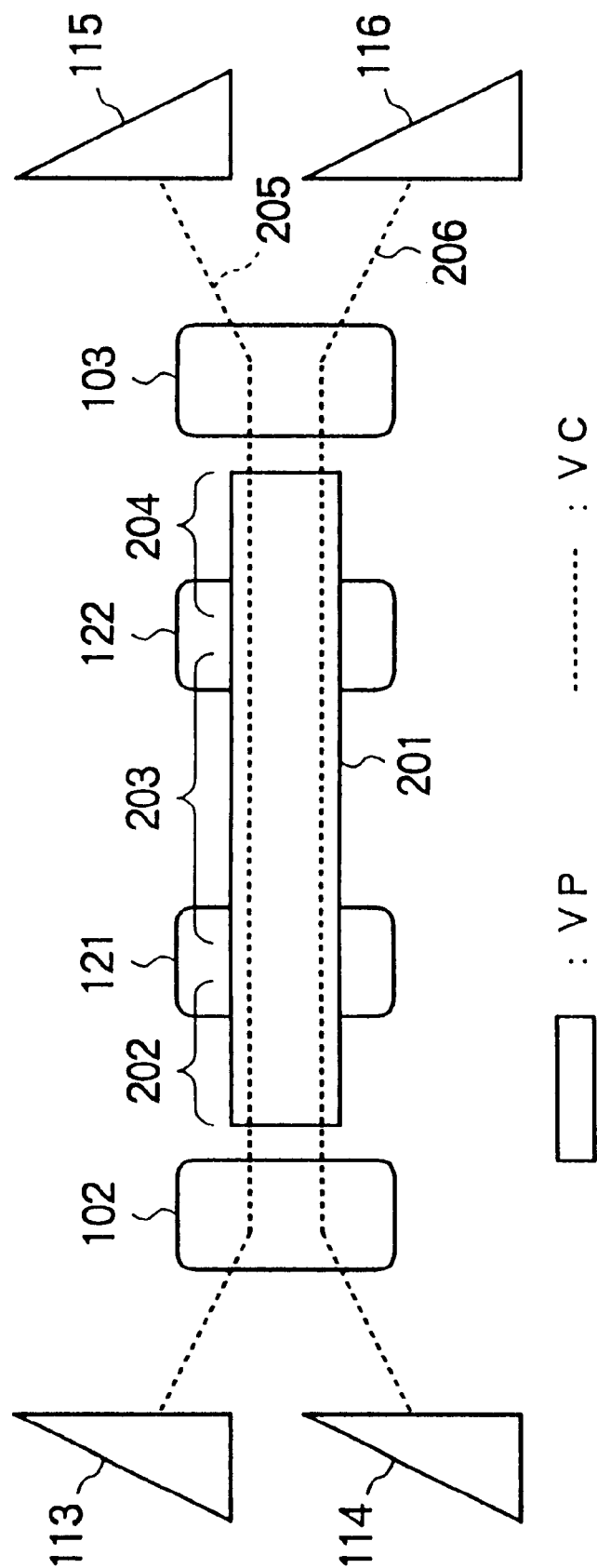
FIG. 2 shows a logical structure of a conventional asynchronous transfer mode network.

Referring to FIG. 2, operation of the ATM network is described below.

FIG. 2 shows a logical structure of a part of the ATM network illustrated in FIG. 1. When a call is established between the terminals 113 and 115, at first, a virtual path (VP) 201 is established between the ATM subscriber switches 102 and 103 by the ATM subscriber switches 102 and 103 and the ATM transit switches 121 and 122.

Namely, the terminal 113 which is a source of a call initiation supplies a call initiation signal which includes a traffic descriptor (or demand bandwidth information) to the ATM subscriber switch 102. The ATM subscriber switch 102 judges whether or not a first virtual path 202 can be established between itself and the ATM transit switch 121 on the basis of the call initiation signal, present occupied bandwidth information held by itself, and useable bandwidth (or hardware resource) information held by itself. Then, the ATM subscriber switch 102 establishes the first virtual path 202 between itself and the ATM transit switch 121 together with the ATM transit switch 121 when it judges that the first virtual path 202 can be established between itself and the ATM transit switch 121. Similarly, the ATM transit switch 121 establishes a second virtual path 203 between it and the ATM transit switch 122. In addition, the ATM transit switch 122 establishes a third virtual path 204 between it and the ATM subscriber switch 103 like the ATM subscriber switch 102 and the ATM transit switch 122. Therefore, the virtual path 201 is established between the ATM subscriber switches 102 and 103. Then, a virtual channel (VC) 205 is established between the terminals 113 and 115 so as to be accommodated in the virtual path 201 between the ATM subscriber switches 102 and 103.

In this situation, if the terminal 114 demands to establish another call between it and the terminal 116, the ATM subscriber switches 102 and 103 and the ATM transit switches 121 and 122 try extending the bandwidth of the virtual path 201 to accommodate another virtual path. If the bandwidth of the virtual path 201 can be extended, another virtual channel 206 is established between the terminals 114 and 116.

On the other hand, when a call is completed, the ATM subscriber switches 102 and 103 and the ATM transit switches 121 and 122 reduce the bandwidth of the virtual path 201 or release the virtual path 201.

As mentioned above, the ATM subscriber switches 102 and 103 and the ATM transit switches 121 and 122 carry out the operation about the virtual path bandwidth only whenever the call initiation is produced and completed.

Referring to FIGS. 3 through 8 together with FIGS. 1 and 2, the description will proceed to an asynchronous transfer mode network according to a preferred embodiment of this invention.

Basically, the ATM network is similar to the conventional ATM network illustrated in FIG. 1. Namely, the ATM network comprises a plurality of ATM subscriber switches which are connected to terminals. At least one ATM transit switch connects the ATM subscriber switches to one another.

However, the ATM network is different from the conventional ATM network in operations of the ATM subscriber switches and the ATM transit switches.

Figure 3:
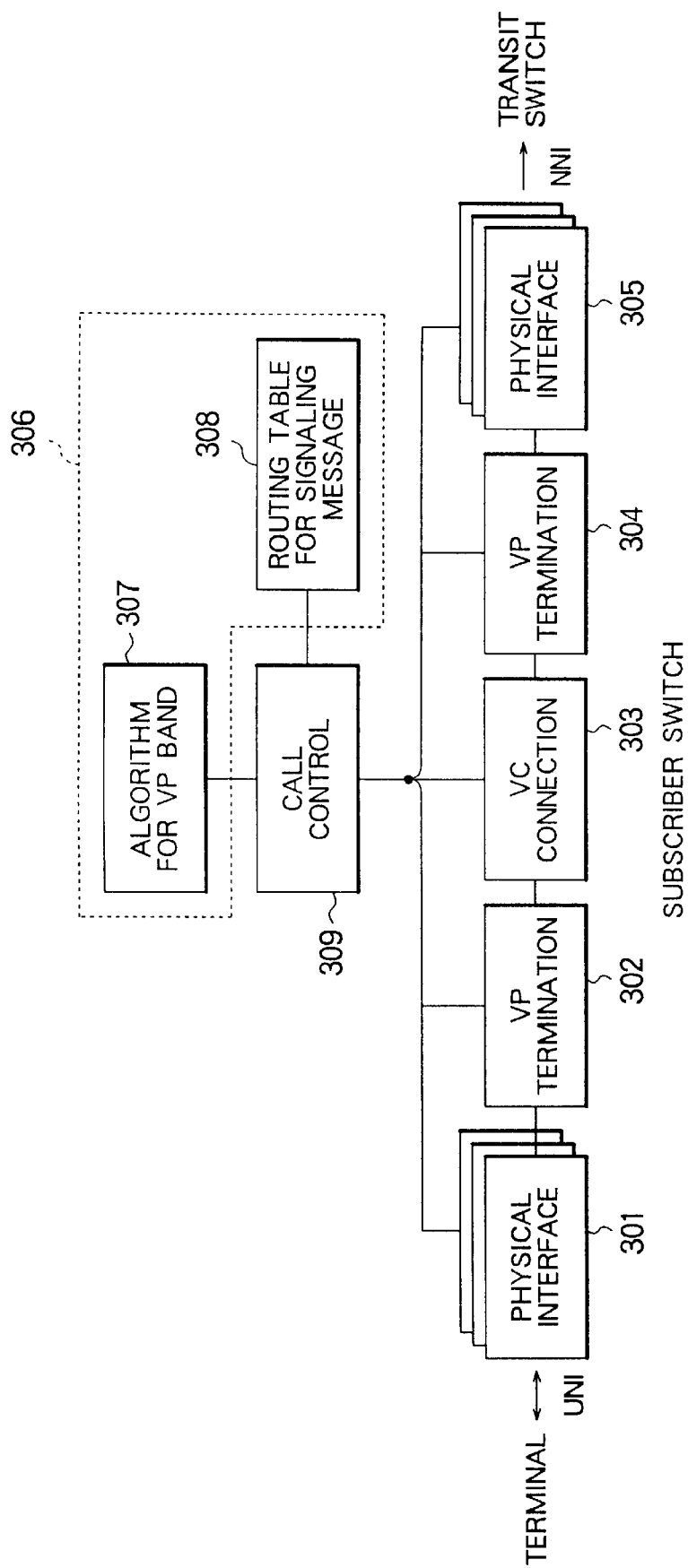
FIG. 3 is a block diagram of a subscriber switch according to a preferred embodiment of this invention.

In FIG. 3, the ATM subscriber switch has a first physical interface section 301 which has a plurality of user-network interfaces (UNIs) which are connected to terminals. A first VP termination section 302 is connected to the first physical interface section 302. A VC connection section 303 is connected to the first VP termination section 302. A second VP termination section 304 is connected to the VC connection section 303. A second physical interface section 305 is connected to the second VP termination section 304 and has a plurality of network-network interfaces (NNIs) each of which is connected to the ATM transit switch. A memory 306 has a algorithm section 307 which stores an algorithm for a VP band and has a routing table section 308 which memorizes a routing table for a signaling message. A call control section 309 is connected to the first physical interface section 301, the first VP termination section 302, the VC connection section 303, the second VP termination section 304, the second physical interface section 305 and the memory 306.

Figure 4:
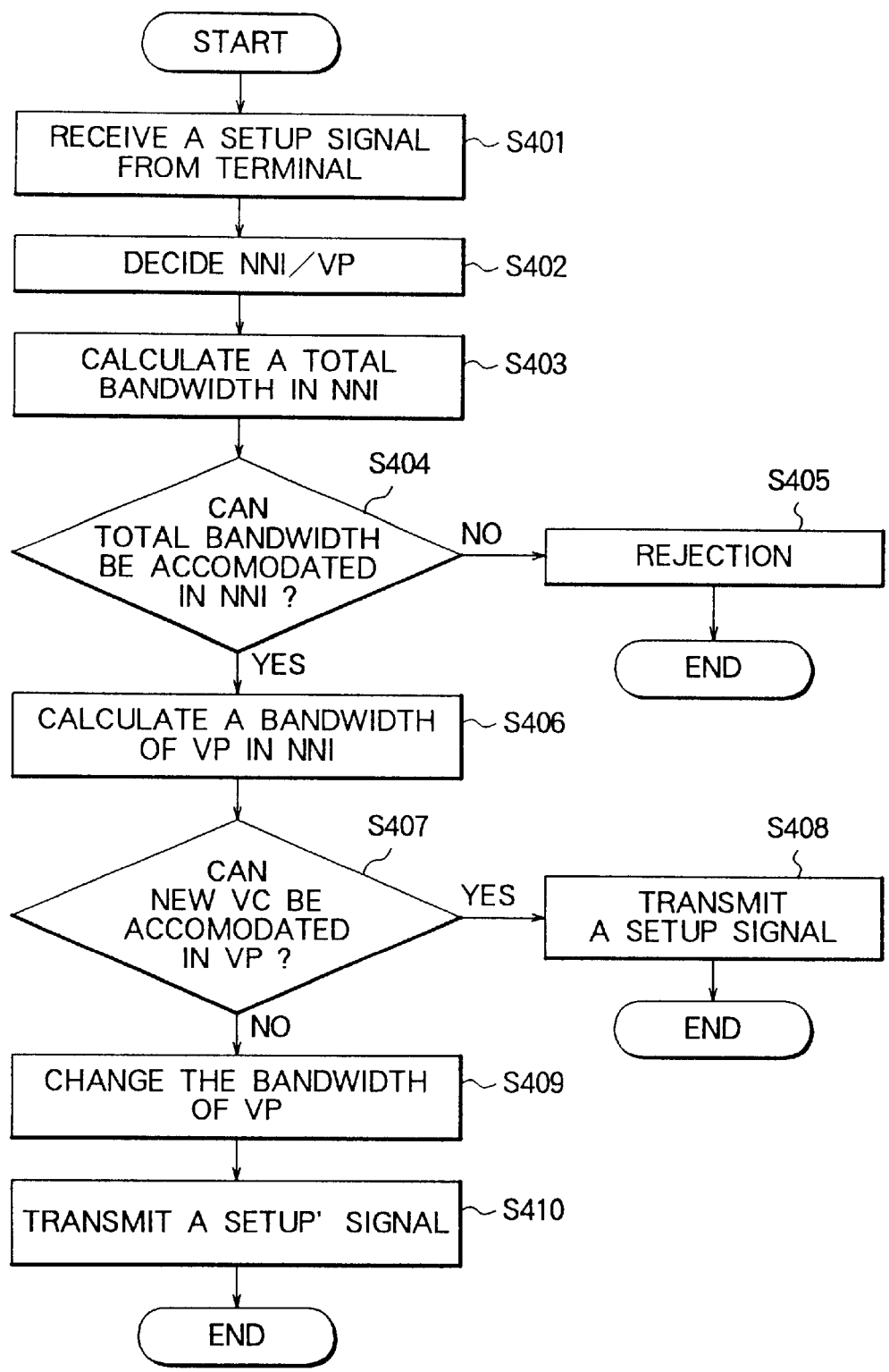
FIG. 4 is a flow chart for describing an operation of the subscriber switch of FIG. 3.

An operation of the ATM subscriber switch is described below. The call control section 309 of the ATM subscriber switch operates as illustrated in FIG. 4.

Here, it is assumed that virtual paths (VPs) are established between every combination of two ATM subscriber switches in the ATM network. In the initial state, each of the virtual paths VPs has a bandwidth of zero.

Each of the terminals produces a SETUP signal and sends it to the ATM subscriber switch when it demands to set up a call between itself and a destination terminal.

The first physical interface section 301 of the ATM subscriber switch receives the SETUP signal sent from one of the terminals. The SETUP signal includes a destination number which is representative of the destination terminal and a traffic descriptor (or bandwidth information) which is representative of a request bandwidth. The first physical interface section 301 supplies the SETUP signal to the call control section 309 (step S401).

The call control section 309 selects one from network-network interfaces of the second physical interface section 305 and selects one from the virtual paths on the basis of both the destination number and the routing table memorized in the memory 306 (step S402). The selected virtual path is established through the selected network-network interface.

The call control section 309 calculates a total bandwidth of used bandwidth in the selected network-network interface and the request bandwidth (step S403). Then, the call control section 309 judges whether or not the call can be established through the selected network-network interface (step 404). Namely, the call control section 309 compares the total bandwidth with the maximum bandwidth which is allowed for the selected network-network interface.

If the total bandwidth is larger than the maximum bandwidth, the call control section 309 decides that the call can not be established. In this case, the call control section 309 produces a release signal to refuse the demand of the terminal which produces the SETUP signal and supplies the release signal to the terminal (step S405).

On the other hand, if the total bandwidth is not more than the maximum bandwidth, the call control section 309 calculates a difference between a bandwidth of the selected virtual path and the total bandwidth (step S406). Then, the call control section 309 judges whether or not the selected virtual path can accommodate a new virtual channel for the call (step S407). Namely, the call control section 309 compares the difference with zero.

If the difference is not less than zero, the call control section 309 decides that the selected virtual path can accommodate the virtual channel. Then, the call control section 309 produces a new SETUP signal and supplies the SETUP signal to the ATM transit switch connected to the selected network-network interface. In this event, the selected virtual path is not changed about the bandwidth.

On the other hand, if the difference is less than zero, the call control section 309 decides that the selected virtual path can not accommodate the virtual channel. In this case, the call control section 309 seizes predetermined additional bandwidth for the selected virtual path and extends the selected virtual path (step S409). Moreover, the call control section 309 produces a SETUP' signal and transmits the SETUP' signal to the ATM transit switch connected to the selected network-network interface (step S410). The SETUP' signal demands extending bandwidth of the virtual path in the latter stage of the ATM network.

Figure 5:
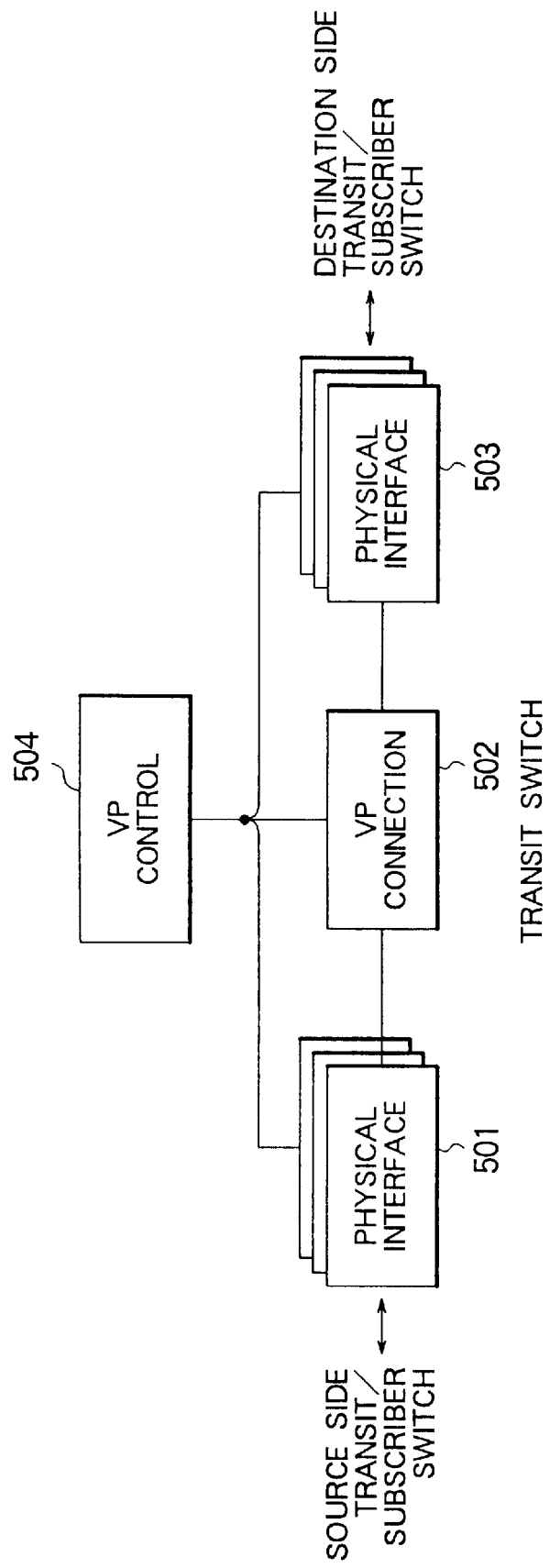
FIG. 5 is a block diagram of a transit switch according to a preferred embodiment of this invention.

In FIG. 5, the ATM transit switch includes a first physical interface section 501 which has a plurality of interfaces connected to ATM subscriber switches. A VP connection section 502 is connected to the first physical interface 501. A second physical interface section 503 is connected to the VP connection section 502. A VP control section 504 is connected to the first physical interface section 501, the VP connection section 502 and the second physical interface section 503.

Figure 6:
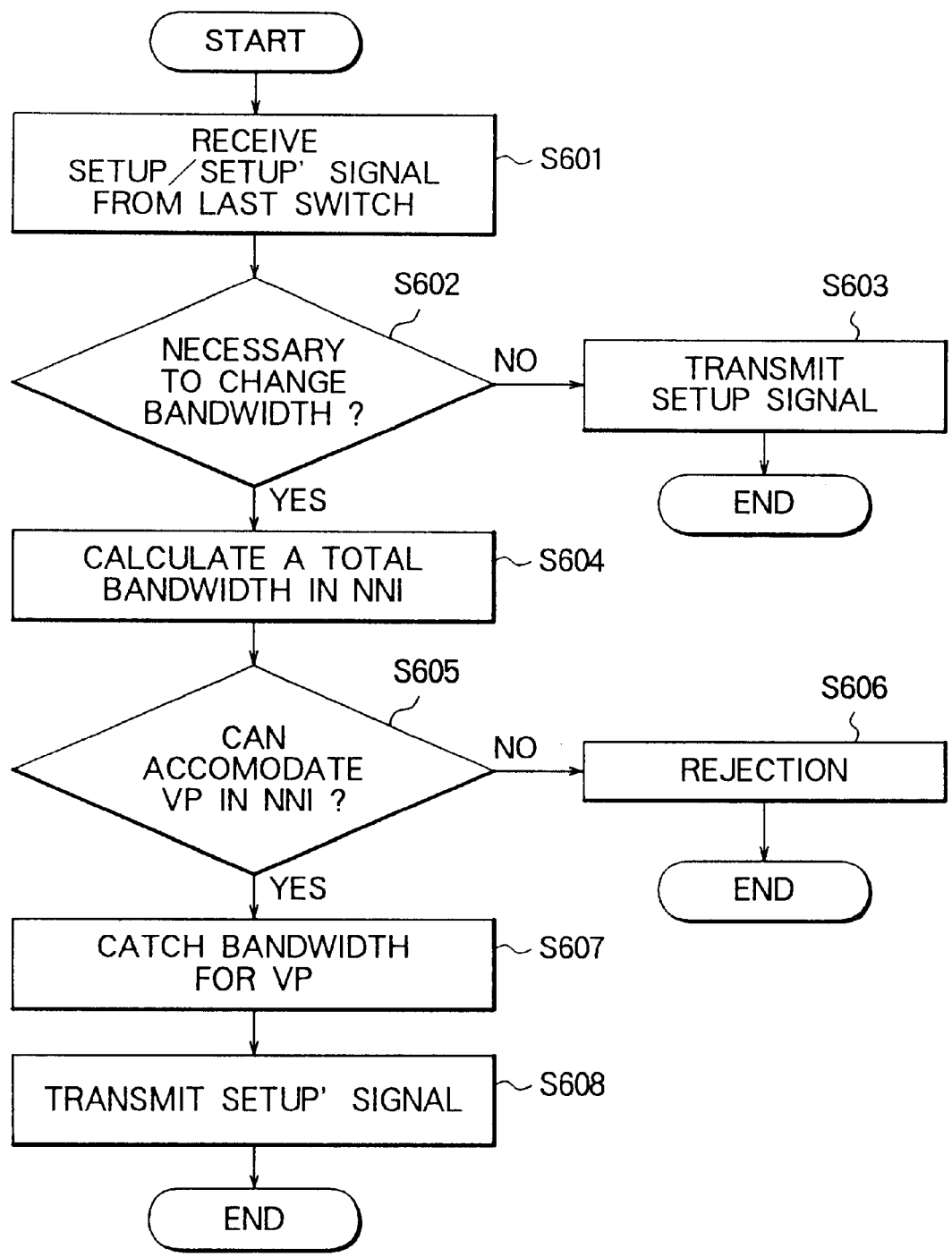
FIG. 6 is a flow chart for describing an operation of the transit switch of FIG. 5.

The VP control 504 operates as shown in FIG. 6. Namely, the ATM transit switch receives the SETUP signal or the SETUP' signal sent from a last stage switch (i.e. the ATM subscriber switch or the ATM transit switch) as a received signal at the first physical interface section 501. The first physical interface section 501 supplies the received signal to the VP control section 504 (step S601).

The VP control section 504 judges whether the received signal is the SETUP signal or the SETUP' signal (step S602). If the received signal is the SETUP signal, the VP control section 504 selects one from interfaces of the second physical interface section 503 on the basis of the destination number included in the SETUP signal. Then, the VP control section 504 supplies the SETUP signal to a next stage switch (i.e. the ATM subscriber switch or the ATM transit switch) through the selected interface of the second physical interface section 503 (step S603).

Similarly, the VP control section 504 selects one from the interfaces of the second physical interface section 503 on the basis of the destination number included in the SETUP' signal when the received signal is the SETUP' signal. Then, the VP control section 504 calculates a total bandwidth of the used bandwidth at the selected interface and the request bandwidth (step S603). Next, the VP control section 504 judges whether or not the total bandwidth can be caught in the selected interface (step S604).

When the total bandwidth can not be caught in the selected interface, the VP control section 504 supplies a release signal to the last stage switch.

On the other hand, when the total bandwidth can be caught in the selected interface, the VP control section 504 catches the necessary bandwidth for the call and extends the virtual path (step S606) at the interface received the SETUP' signal and at the selected interface. In addition, the VP control section 504 sends the SETUP' signal to the next stage switch.

Hereafter, another ATM transit switch operates as mentioned above to establish the call between the source and the destination terminal.

The ATM subscriber switch connected to the destination terminal establishes the virtual channel between the last ATM transit switch and the destination terminal when it receives the SETUP signal. Moreover, the ATM subscriber switch connected to the destination terminal extends the virtual path between itself and the last switch and establishes the virtual channel between the last ATM transit switch and the destination when it receives the SETUP' signal.

In a case that the virtual channel is released, the ATM subscriber switches and the ATM transit switches operate similar to the case as mentioned above. In this case, reducing the bandwidth of the virtual path is carried out in place of extending the bandwidth when it is necessary.

From the explanation of the operation, it is easy understood that the bandwidth of the virtual path does not always change when the call initiation occurs. This is because each of the ATM subscriber switches and the ATM transit switches changes the bandwidth of the virtual path VP by a predetermined step S as shown in FIG. 7.

Figure 7:
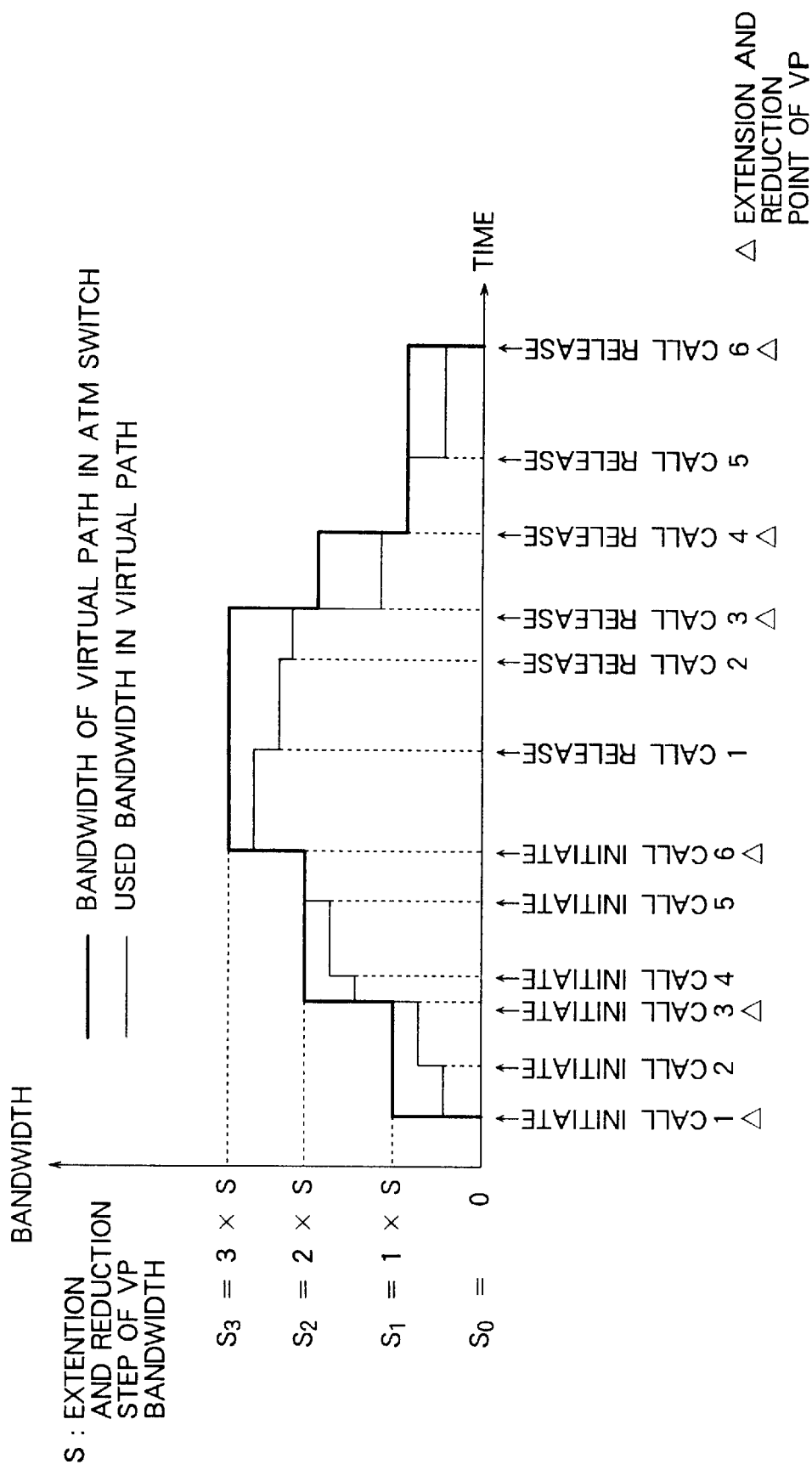
FIG. 7 is a graph for describing the operation of the transit switch of FIG. 5.
Figure 8:
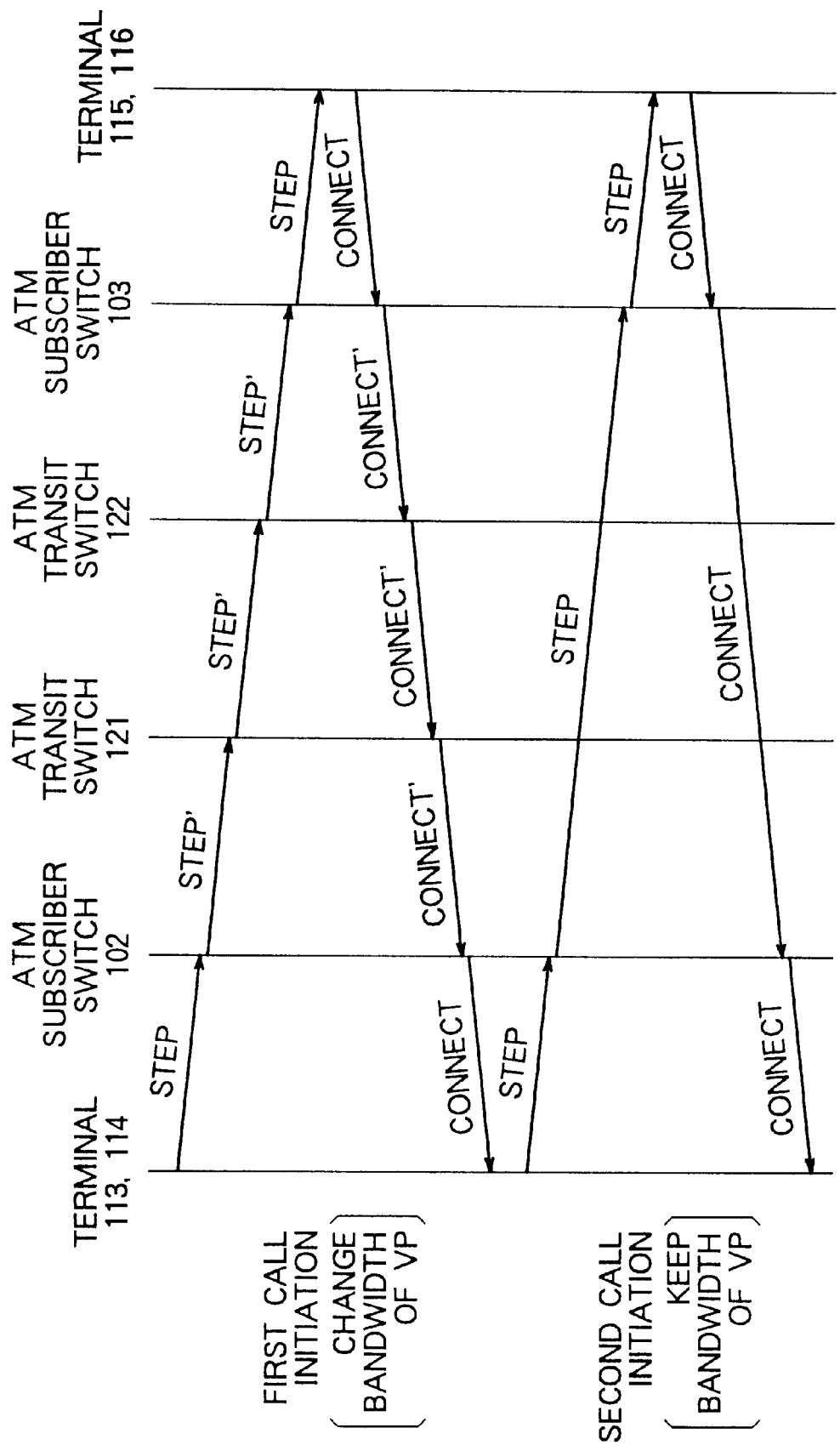
FIG. 8 is a signal flow chart for describing signaling in the asynchronous transfer mode network of FIG. 2.

In FIG. 7, a bold line shows a change of the bandwidth of the virtual path while a fine line shows a change of the used bandwidth in the virtual path. When a first call initiation occurs, the ATM transit switch extends the bandwidth of the virtual path from zero to S1 (=1×S). Next, when a second call initiation occurs, the ATM transit switch keeps the bandwidth of S1. Then, when a third call initiation occurs, the ATM transit switch extends the bandwidth from S1 to S2 (=2×S). When fourth and fifth call initiation occur, the ATM transit switch keeps the bandwidth of S2. When a sixth call initiation occurs, the ATM transit switch extends the bandwidth from S2 to S3 (=3×S).

On the other hand, when first and second release of the call occur, the bandwidth is kept in a bandwidth of S3. When a third release of the call occurs, the ATM transit switch reduces the bandwidth from S3 to S2. Moreover, when a fourth release of the call occur, the ATM transit switch reduces the bandwidth from S2 to S1. When fifth release of the call occur, the bandwidth is kept in a bandwidth of S1. When a sixth release of the call occurs, the ATM transit switch reduces the bandwidth from S1 to zero.

It is assumed that the ATM network has a structure shown In FIG. 2. In this case, signals are transmitted as shown in an upper section of FIG. 8, when the first call initiation occurs. Moreover, signals are transmitted as shown in a lower section of FIG. 8, when the second call initiation occurs. Namely, each ATM transit switch pass through the SETUP signal and a CONNECT signal and deals with the SETUP' signal and the CONNECT' signal.

Therefore, the ATM transit switch is lightened of its load because it passes through the SETUP signal and the CONNECT signal. For example, when S is equal to 100 Mbps and an average bandwidth of the virtual channels is equal to 10 Mbps, the load of the ATM transit switch becomes about 1/10 as compared with the conventional ATM transit switch.

While this invention has thus for been described in conjunction with preferred embodiment thereof, it will readily be possible for those skilled in the art to put this invention into practice in various other manners. For example, the predetermined steps S1, S2, S3 . . . may be unequal steps. For example, S1, S2, S3, S4, S5, S6, S7, S8, . . . may be equal to 10 Mbps, 20 Mbps, 30 Mbps, 40 Mbps, 50 Mbps, 200 Mbps, 400 Mbps, 600 Mbps, . . . , respectively.

What is claimed is:

1. A method of controlling a bandwidth of a virtual path accommodating a virtual channel in an asynchronous transfer mode network, the virtual path established between two subscriber switches through at least one transit switch, the virtual channel established between two terminals respectively connected to said two subscriber switches, said method comprising:

detecting, at a specific subscriber switch being one of said two subscriber switches, a command signal sent from said terminal respectively connected to said specific subscriber switch, said command signal establishing/releasing the virtual channel at said specific subscriber switch;

judging at said specific subscriber switch whether or not it is necessary to change the bandwidth of the virtual path to respond to the command signal;

producing at said specific subscriber switch a direction signal directing said at least one transit switch comprising said virtual path to extend/reduce the bandwidth of the virtual path when said specific subscriber switch judges that it is necessary to change the bandwidth of the virtual path; and extending/reducing the bandwidth of the virtual path at each of said at least one transit switch comprising said virtual path by a predetermined step in response to the direction signal.

2. A method as claimed in claim 1, wherein said method further comprises;

producing a passage signal for directing the other subscriber switch of said two subscriber switches to establish/release the virtual channel at said other subscriber switch when said specific subscriber switch judges that it is not necessary to change the bandwidth of the virtual path; and sending the passage signal from said specific subscriber switch to the other subscriber switch through the virtual path.

3. A subscriber switch for use in an asynchronous transfer mode network having at least one source terminal and at least one destination terminal and at least one transit switch said subscriber switch connected to one of said source terminal or said destination terminal and to at least one of said at least one transit switch, said subscriber switch establishing a virtual path to accommodate a virtual channel, said subscriber switch comprising;

a detector to receive a command signal sent from said source terminal or destination terminal connected to said subscriber switch, said command signal establishing/releasing the virtual channel;

a decision circuit connected to said detector determining whether or not it is necessary to change a bandwidth of the virtual path in response to the command signal; and a signal generator connected to said decision circuit producing a direction signal directing said at least one transit switch to extend/reduce the bandwidth of the virtual path when said decision circuit judges that it is necessary to change the bandwidth of the virtual path.

4. A subscriber switch claimed in claim 3, wherein said signal generator further produces a passage signal which passes through said at least one transit switch to establish/release the virtual channel when said said decision circuit judges that it is not necessary to change the bandwidth of the virtual path.

5. A transit switch in an asynchronous transfer mode network for establishing a virtual path to accommodate a virtual channel, said transit switch comprising:

a receiver receiving a transmission signal sent from a first subscriber switch;

a discrimination circuit connected to said receiver determining whether said signal is a direction signal or a passage signal;

a bandwidth changer to either increase or reduce a bandwidth of the virtual path in response to a direction, when said transmission signal is the direction signal, and a switch passing the transmission signal to a second subscriber switch indicated by the transmission signal, when the transmission signal is the passage signal.

6. An asynchronous transfer mode network using a virtual path to accommodate a virtual channel, the virtual path established between two subscriber switches through at least one transit switch, each said subscriber switch respectively connected to a terminal, said asynchronous transfer mode network comprising;

a detector in each said subscriber switch for detecting a command signal sent from said terminals for establishing/releasing the virtual channel;

a decision circuit in each said subscriber switch connected to said detector, said decision circuit determining whether or not it is necessary to change a bandwidth of the virtual path to respond to the command signal;

a signal generator in each said subscriber switch connected to said decision circuit, said signal generator producing a direction signal directing said at least one transit switch to extend/reduce the bandwidth of the virtual path when said decision circuit determines that it is necessary to change the bandwidth of the virtual path; and a bandwidth changer in said at least one transit switch for extending/reducing the bandwidth of the virtual path by a predetermined step in response to the direction signal.

7. The method of claim 1, wherein said at least one transit switch selectively changes the bandwidth upon receipt of said direction signal.

8. The method of claim 1, wherein, when said subscriber switch judges that a change of the bandwidth is unnecessary, said at least one transit switch is free from changing the bandwidth.

* * * * *